(12) United States Patent
Dudhe et al.

(10) Patent No.: US 11,668,037 B2
(45) Date of Patent: Jun. 6, 2023

(54) TURBIDITY REMOVAL SYSTEM FOR AN APPLIANCE

(71) Applicant: WHIRLPOOL CORPORATION, Benton Harbor, MI (US)

(72) Inventors: Rahul Dudhe, Pune (IN); Parul Goel, Pune (IN); Mandar Kumbhare, Pune (IN); Samir Nimkar, Maharashtra (IN); Satyanjay Sahoo, Maharashtra (IN); Anshu Shukla, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 353 days.

(21) Appl. No.: 16/857,329

(22) Filed: Apr. 24, 2020

(65) Prior Publication Data

US 2021/0332518 A1  Oct. 28, 2021

(51) Int. Cl.

| | | |
|---|---|---|
| *D06F 39/10* | (2006.01) | |
| *D06F 33/08* | (2006.01) | |
| *B01D 11/04* | (2006.01) | |
| *D06F 33/34* | (2020.01) | |
| *B01D 21/00* | (2006.01) | |
| *D06F 39/02* | (2006.01) | |

(52) U.S. Cl.
CPC .......... *D06F 33/08* (2013.01); *B01D 11/0473* (2013.01); *B01D 21/0045* (2013.01); *D06F 33/34* (2020.02); *D06F 39/02* (2013.01); *D06F 39/10* (2013.01)

(58) Field of Classification Search
CPC ........ D06F 39/006; D06F 39/02; D06F 39/08; D06F 39/083; D06F 39/088; D06F 39/10; A47L 15/4202; A47L 15/4204; A47L 15/4206; A47L 15/4214; A47L 15/4219; B01D 21/0003; B01D 21/0006; B01D 21/0024; B01D 21/0039; B01D 21/0045; B01D 21/0066; B01D 21/10; B01D 21/245; B01D 21/26; B01D 21/265; B01D 36/02; B01D 36/04; B01D 36/045; B01D 43/00; B01D 2221/02
See application file for complete search history.

(56) References Cited

U.S. PATENT DOCUMENTS

| | | | |
|---|---|---|---|
| 2,665,975 A | 1/1954 | Ng | |
| 3,466,901 A * | 9/1969 | Reid | ........................ D06F 39/10 210/167.01 |
| 3,886,064 A | 5/1975 | Kosonen | |
| 3,891,548 A | 6/1975 | Marcussen | |

(Continued)

*Primary Examiner* — David G Cormier
(74) *Attorney, Agent, or Firm* — Price Heneveld LLP

(57) ABSTRACT

A particulate separating mechanism for an appliance includes a fluid inlet that receives an inlet fluid. The inlet fluid includes particulate matter. A labyrinth separator is positioned to generate a first turbulence of the fluid. The first turbulence separates a first portion of the particulate matter into a particulate collection portion. A main filter is positioned downstream of the labyrinth separator and has a constricting portion and opposing turbulence chambers that are vertically oriented to produce a second turbulence of the fluid. The second turbulence separates a second portion of the particulate matter from the fluid. A fluid outlet delivers the fluid having the first and second portions of the particulate matter removed into a processing chamber for processing articles.

16 Claims, 9 Drawing Sheets

(56) References Cited

U.S. PATENT DOCUMENTS

| | | | |
|---|---|---|---|
| 4,116,789 A | * | 9/1978 | King .................... B03D 1/1412 |
| | | | 204/571 |
| 5,340,469 A | | 8/1994 | Montgomery |
| 5,904,850 A | | 5/1999 | Vellinga |
| 6,238,523 B1 | | 5/2001 | Lawson |
| 6,820,447 B2 | | 11/2004 | Thies et al. |
| 7,073,520 B2 | | 7/2006 | Zanello et al. |
| 7,243,512 B2 | | 7/2007 | Kim et al. |
| 7,406,843 B2 | | 8/2008 | Thies et al. |
| 8,485,367 B2 | | 7/2013 | Mathew et al. |
| 9,220,392 B2 | | 12/2015 | Morrison et al. |
| 9,422,661 B2 | | 8/2016 | Mantle et al. |

\* cited by examiner

US 11,668,037 B2

TURBIDITY REMOVAL SYSTEM FOR AN APPLIANCE

BACKGROUND OF THE DISCLOSURE

The present disclosure generally relates to appliances, and more specifically, a turbidity removal system for separating particulate matter and other foreign matter from fluid used within various appliances.

SUMMARY OF THE DISCLOSURE

According to one aspect of the present disclosure, a laundry appliance includes a fluid inlet that receives fluid having a first turbidity level. A plurality of labyrinth chambers generate a turbulence flow within the fluid to define a second turbidity level. A main filter is positioned downstream of the plurality of labyrinth chambers and has at least one constricting portion and opposing turbulence chambers that produces a third turbidity level. The second turbidity level is less than the first turbidity level and greater than the third turbidity level. A fluid outlet delivers the fluid having the third turbidity level into a processing chamber for processing laundry articles.

According to another aspect of the present disclosure, a particulate separating mechanism for an appliance includes a fluid inlet that receives an inlet fluid. The inlet fluid includes particulate matter. A labyrinth separator is positioned to generate a first turbulence of the fluid. The first turbulence separates a first portion of the particulate matter into a particulate collection portion. A main filter is positioned downstream of the labyrinth separator and has a constricting portion and opposing turbulence chambers that are vertically oriented to produce a second turbulence of the fluid. The second turbulence separates a second portion of the particulate matter from the fluid. A fluid outlet delivers the fluid having the first and second portions of the particulate matter removed into a processing chamber for processing articles.

According to yet another aspect of the present disclosure, a particulate separating mechanism for an appliance includes a fluid inlet that receives an inlet fluid. The inlet fluid includes particulate matter. A labyrinth separator generates a first turbulence of the fluid. The first turbulence separates a first portion of the particulate matter into a particulate collection portion. A main filter is positioned downstream of the labyrinth separator and has a Venturi transition and opposing turbulence chambers that generates a second turbulence of the fluid. The second turbulence separates a second portion of the particulate matter from the fluid. A fluid outlet delivers the fluid having the first and second portions of the particulate matter removed into a processing chamber for processing articles.

These and other features, advantages, and objects of the present disclosure will be further understood and appreciated by those skilled in the art by reference to the following specification, claims, and appended drawings.

Figure 1:
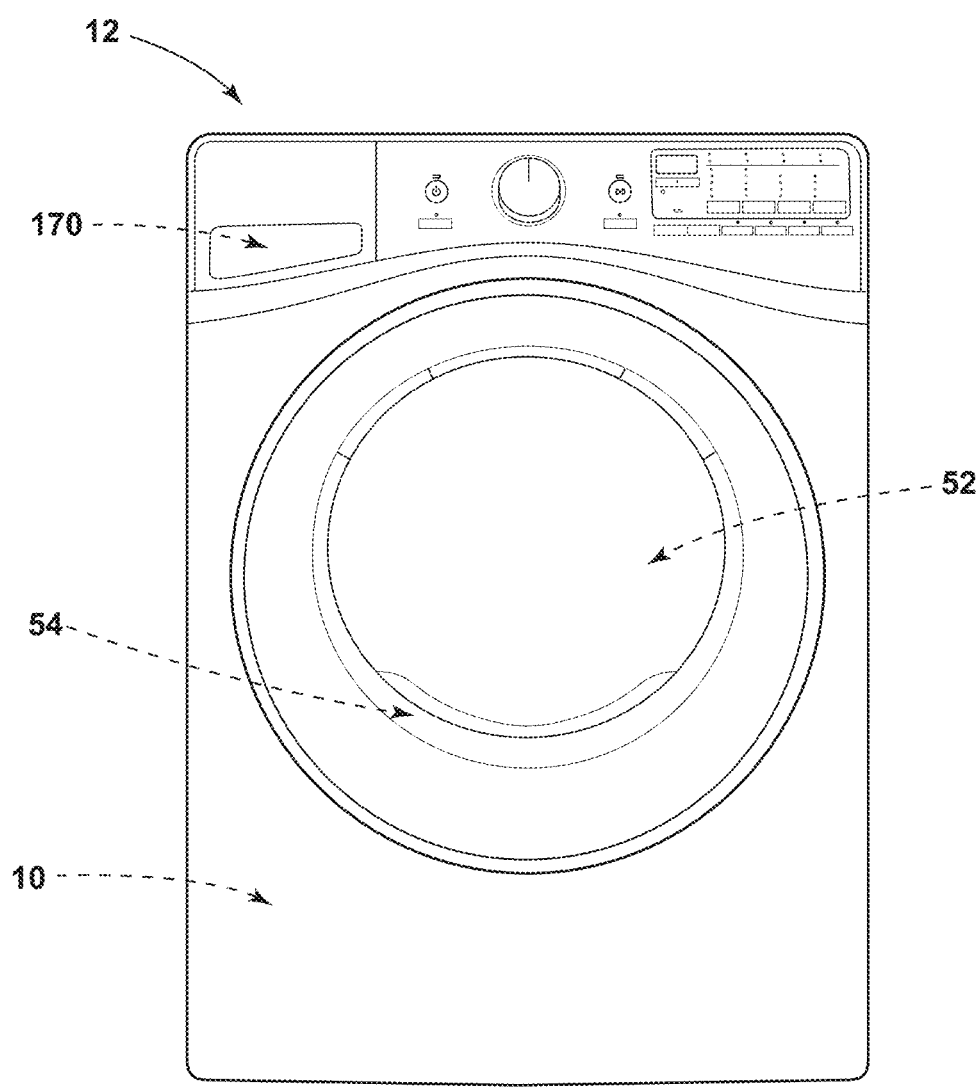
FIG. 1 is a front elevational view of an appliance that incorporates an aspect of the turbidity removal system.
Figure 2:
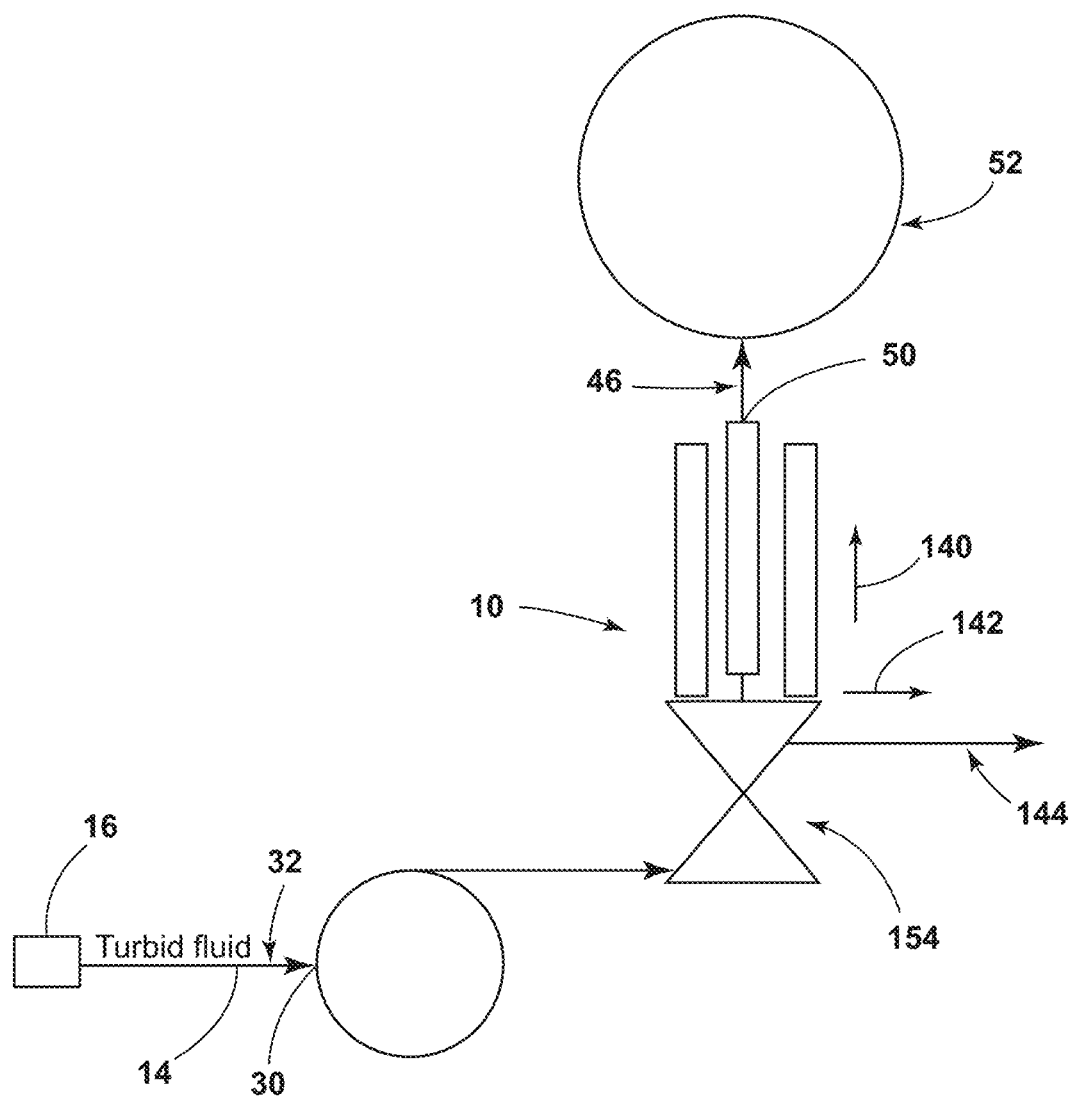
FIG. 2 is a schematic view of an aspect of the turbidity removal system.
Figure 3:
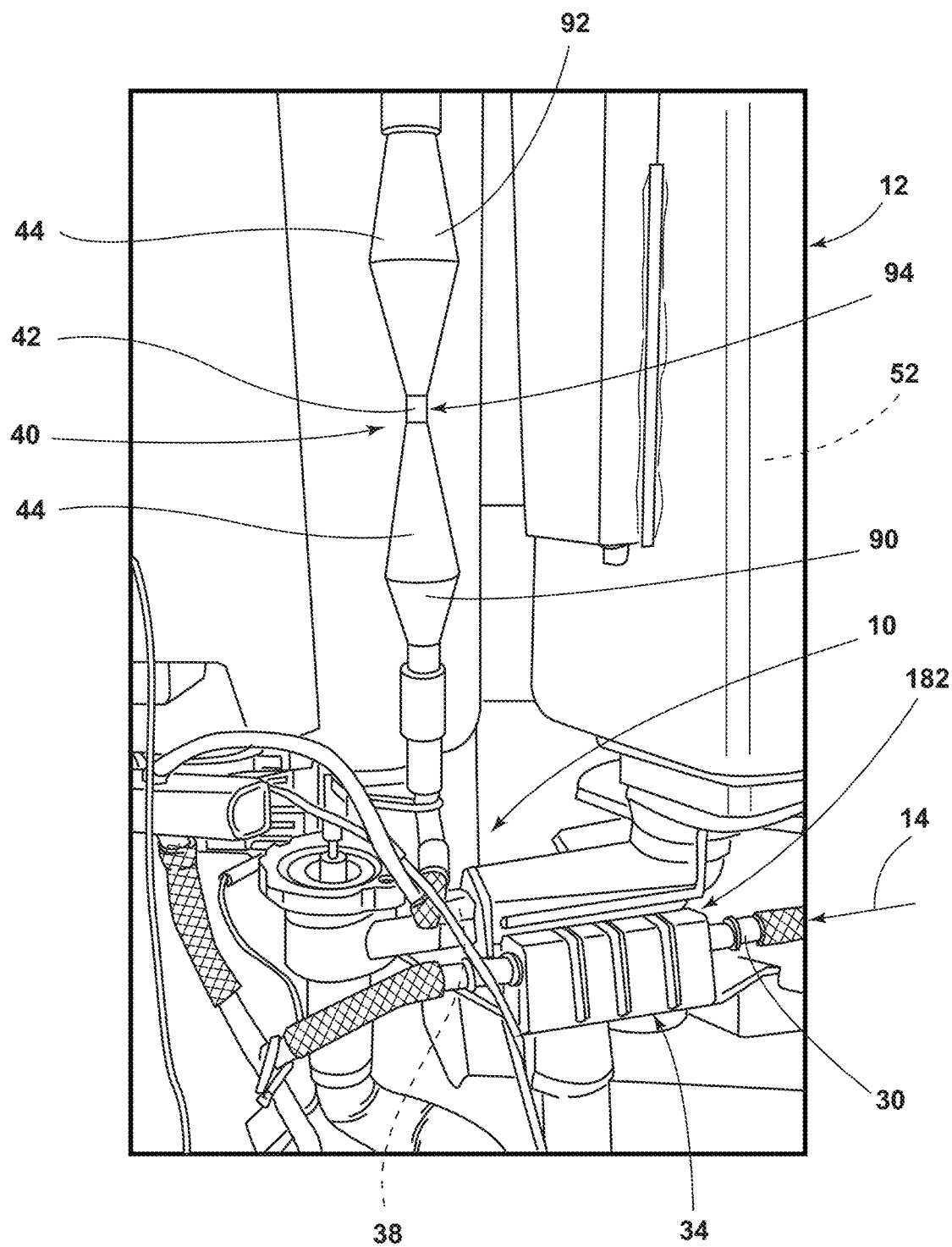
FIG. 3 is a side perspective view of an aspect of the turbidity removal system included within an appliance.

The components in the figures are not necessarily to scale, emphasis instead being placed upon illustrating the principles described herein.

DETAILED DESCRIPTION

The present illustrated embodiments reside primarily in combinations of method steps and apparatus components related to a turbidity removal system for separating material and other foreign matter from fluid to be used within various household and commercial appliances. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-8, reference numeral 10 generally refers to a turbidity removal system for use within an appliance 12. The turbidity removal system 10 is used to filter fluid 14 within an appliance 12, such as from an inlet 16, or recirculated fluid 14 within an appliance 12. Using the turbidity removal system 10, various particulate matter 18, such as particles and foreign material that may cause a cloudiness or haziness of fluid 14, can be removed from the fluid 14 to provide a more efficient use of the fluid 14 within the appliance 12.

According to various aspects of the device, as exemplified in FIGS. 1-9, an appliance 12, such as a laundry appliance 12, can include a fluid inlet 30 that receives fluid 14 having a first turbidity level 32, sometimes referred to as turbid fluid 14. A plurality of labyrinth chambers 34 are included within the turbidity removal system 10 and generate various turbulence flows 36 within the fluid 14 to define a second turbidity level 38. A main filter 40 is positioned downstream of the plurality of labyrinth chambers 34. The main filter 40 of the turbidity removal system 10 includes at least one constricting portion 42 and opposing turbulence chambers 44 that produce additional turbulence flows 36 that result in a third turbidity level 46 of the fluid 14. The second turbidity level 38 is less than the first turbidity level 32, and greater than the third turbidity level 46. Stated another way, as fluid 14 moves through the plurality of labyrinth chambers 34 and the main filter 40, the turbidity of the fluid 14 is progressively reduced through the generation of various turbulence flows 36 within the turbidity removal system 10. These turbulence flows 36 cause the particulate matter 18 to become separated from the fluid 14, thereby reducing the turbidity of the fluid 14 and increasing the illuminance 48 of the fluid 14. After the fluid 14 has passed through the main filter 40, the turbidity removal system 10 includes a fluid outlet 50 that delivers the fluid 14 having the third turbidity level 46 into a processing chamber 52 for processing articles 54, such as laundry articles 54 in the case of a laundry appliance 12.

Referring again to FIGS. 3-8, the turbidity removal system 10 can include a series of labyrinth chambers 34 that receive the fluid 14 from the fluid inlet 30. These labyrinth chambers 34 can also receive recirculated fluid 14 from a processing chamber 52 or other portion of the appliance 12. In such an aspect of the device, the particulate matter 18, which causes the turbidity of the fluid 14, is removed so that the fluid 14 can be recycled through the appliance 12 for reuse. The labyrinth chambers 34 are typically positioned in a horizontal configuration. During use of the labyrinth chambers 34, the particulate matter 18 is ultimately removed from the turbidity removal system 10 via a drain channel 56 that is positioned below the labyrinth chambers 34 for collecting the separated particulate matter 18. The plurality of labyrinth chambers 34 include a series of labyrinth partitions 58 that cause the fluid 14 to move through the labyrinth chambers 34 in a serpentine or sinusoidal pattern. This sinusoidal pattern causes various turbulence flows 36 within each of the labyrinth chambers 34. These turbulence flows 36 cause a churning of the fluid 14 that tends to cause a separation of the various particulate matter 18 from the remainder of the fluid 14. This particulate matter 18, within each of the labyrinth chambers 34, tends to settle within a lower portion 70 of the various labyrinth chambers 34.

In certain aspects of the device, each of the labyrinth chambers 34 can be sized and configured to cause a different type of turbulence flow 36, or a different magnitude of turbulence flow 36, that can be used to separate various sizes of particulate matter 18 from the fluid 14. In such an embodiment, the various labyrinth chambers 34 can be used to separate progressively smaller or larger sized particulate matter 18 from the fluid 14 to progressively reduce the turbidity of the fluid 14 moving through the turbidity removal system 10.

Figure 4:
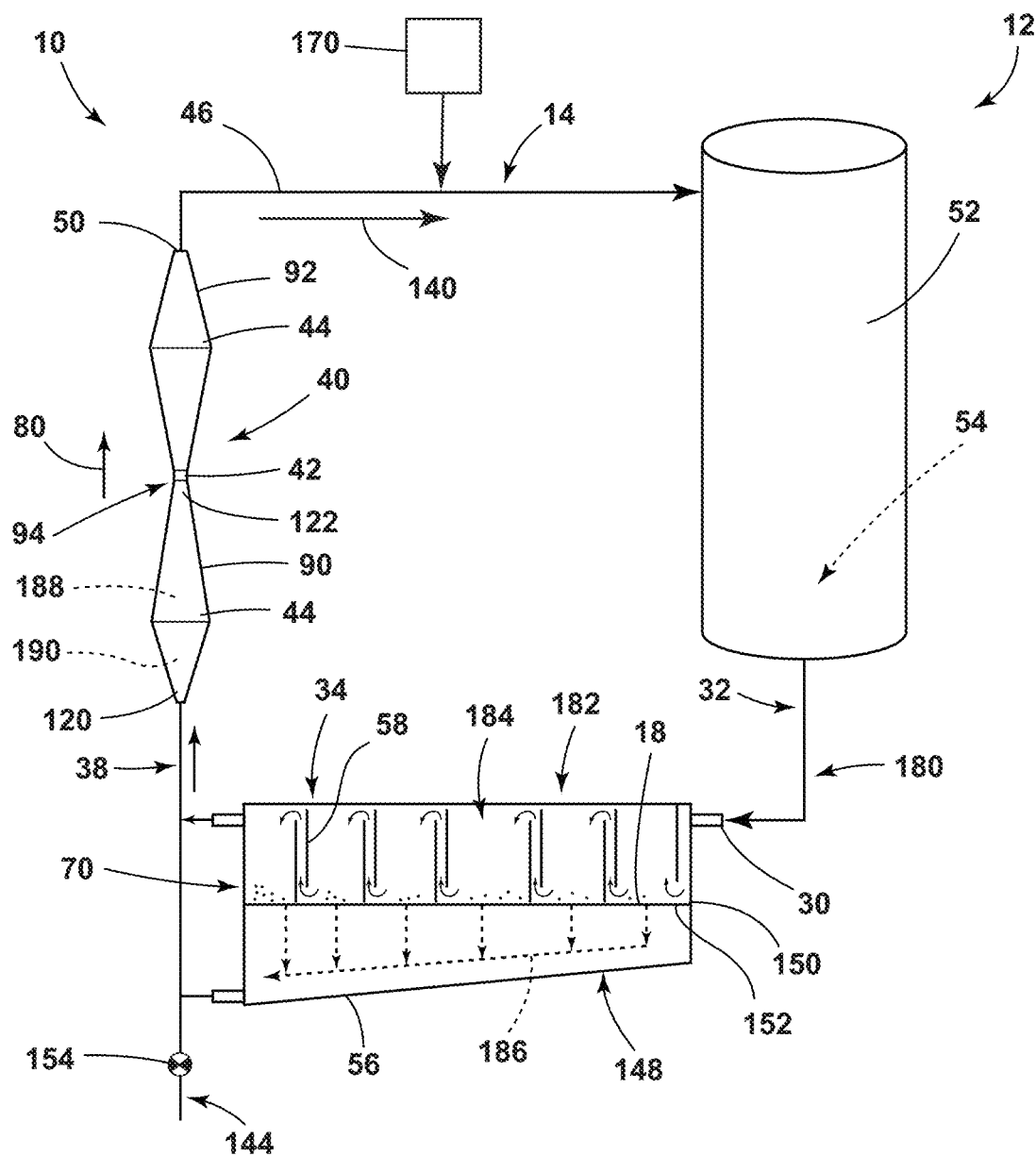
FIG. 4 is a schematic diagram illustrating an aspect of the turbidity removal system and showing operation of the various chambers within the turbidity removal system, and illustrating a filtering direction of the fluid.
Figure 5:
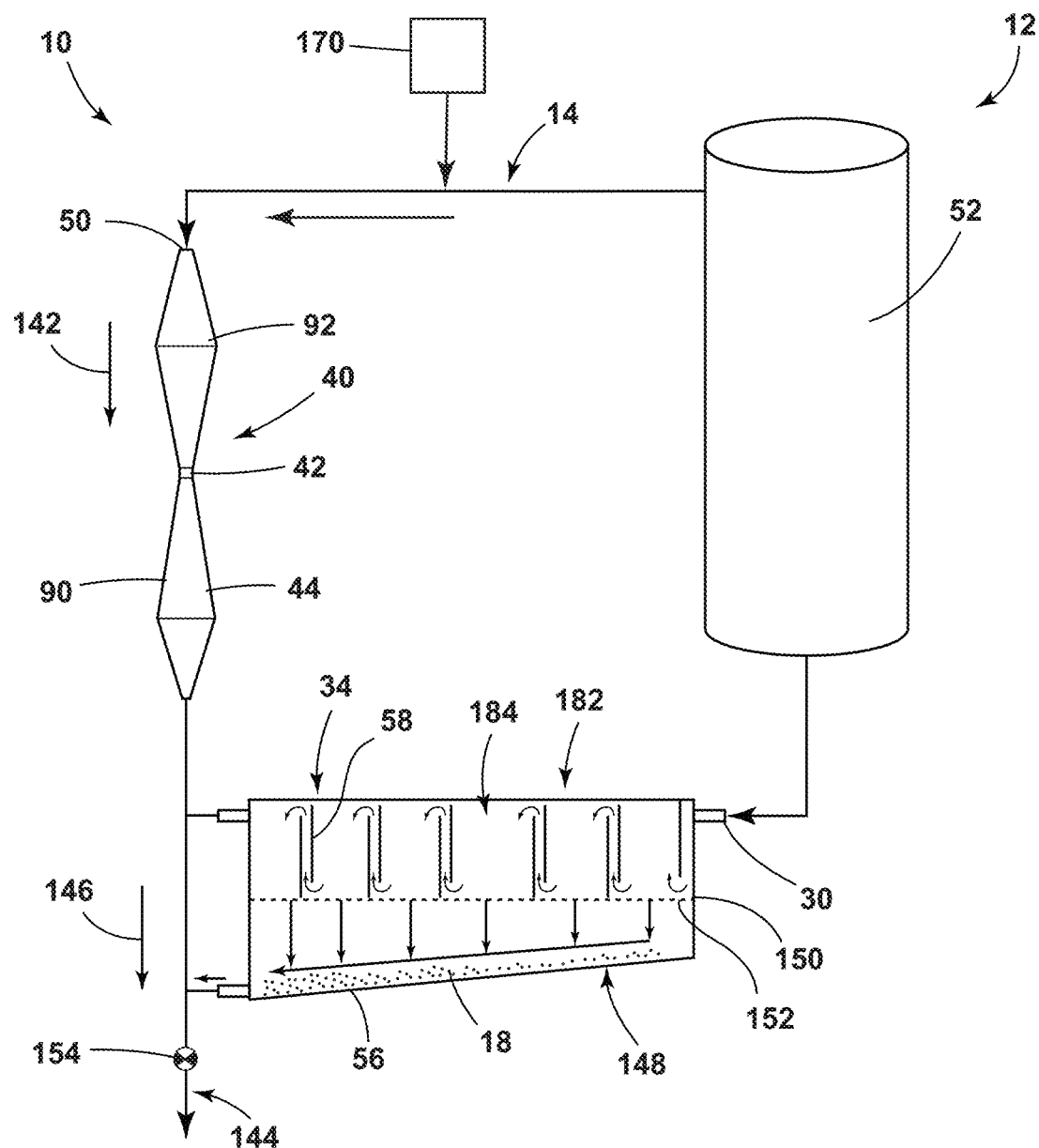
FIG. 5 is a schematic diagram of the turbidity removal system of FIG. 4, and illustrating a flushing direction of the fluid.
Figure 6:
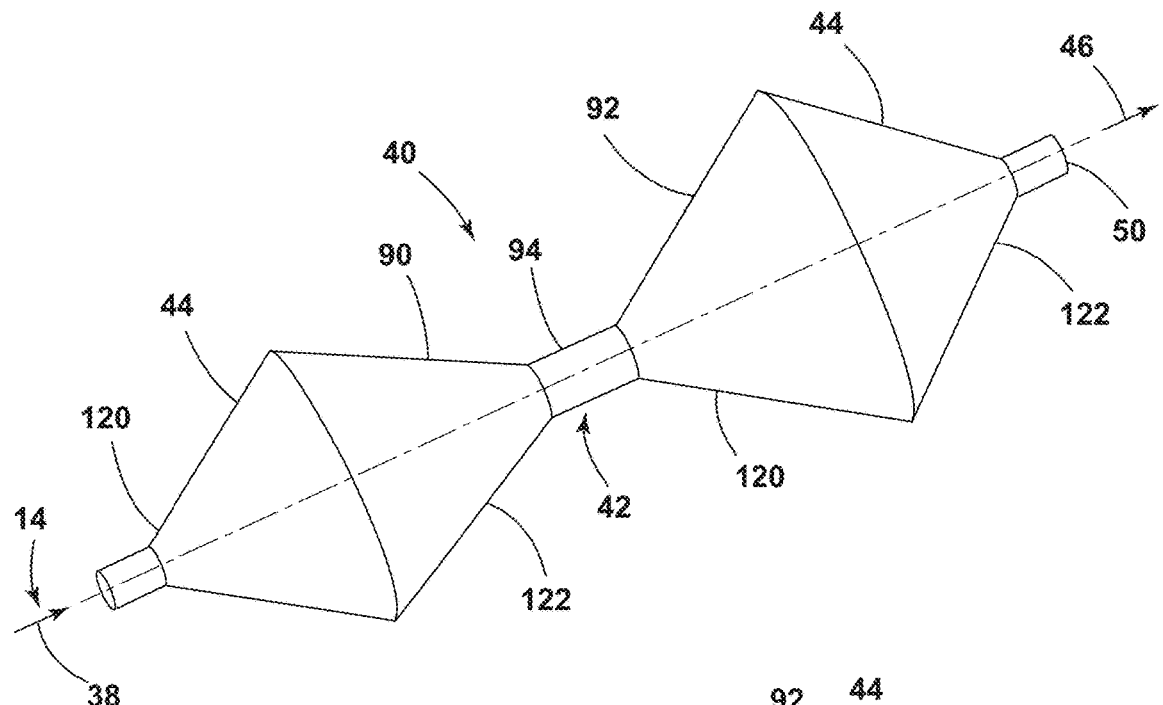
FIG. 6 is a side perspective view of an aspect of the main filter for the turbidity removal system.

As exemplified in FIGS. 3-8, the plurality of labyrinth chambers 34 can include a single labyrinth chamber 34, or a plurality of labyrinth chambers 34 that are consecutively positioned to produce the sinusoidal motion and the turbulence flows 36 within each of the labyrinth chambers 34. By way of example, and not limitation, FIGS. 4 and 5 illustrate six labyrinth chambers 34 and FIGS. 3 and 8 and each show four labyrinth chambers 34. It should be understood that other numbers, combinations, and configurations of the labyrinth chambers 34 can be used to generate the sinusoidal motion, as well as the turbulence flows 36 within each of the labyrinth chambers 34.

Downstream of the labyrinth chambers 34 is positioned the main filter 40. This main filter 40 is typically oriented in a vertical configuration so that the fluid 14 moves in a generally upward direction 80 through the main filter 40. This main filter 40, as discussed herein, typically includes at least one constricting portion 42 and opposing turbulence chambers 44. The constricting portion 42 is typically positioned between the opposing labyrinth chambers 34. After leaving the plurality of labyrinth chambers 34, the fluid 14 is directed in the upward direction 80 to further separate the various particulate matter 18 from the fluid 14. The use of the main filter 40 can be used to separate particularly fine or minute particle sizes of the particulate matter 18 from the fluid 14 for decreasing the turbidity and increasing the illuminance 48 of the fluid 14 used within the appliance 12.

Figure 7:
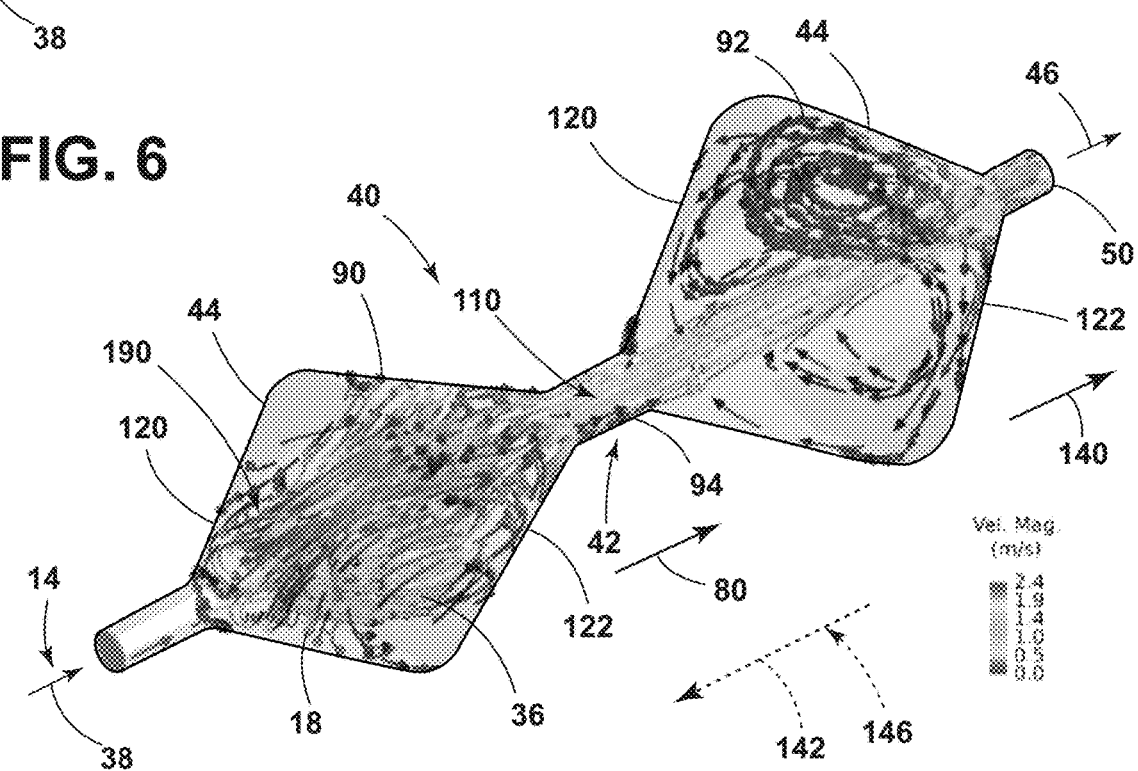
FIG. 7 is a schematic diagram illustrating the main filter of FIG. 6 and showing movement of fluid through the Venturi portion and the opposing turbulence chambers.
Figure 8:
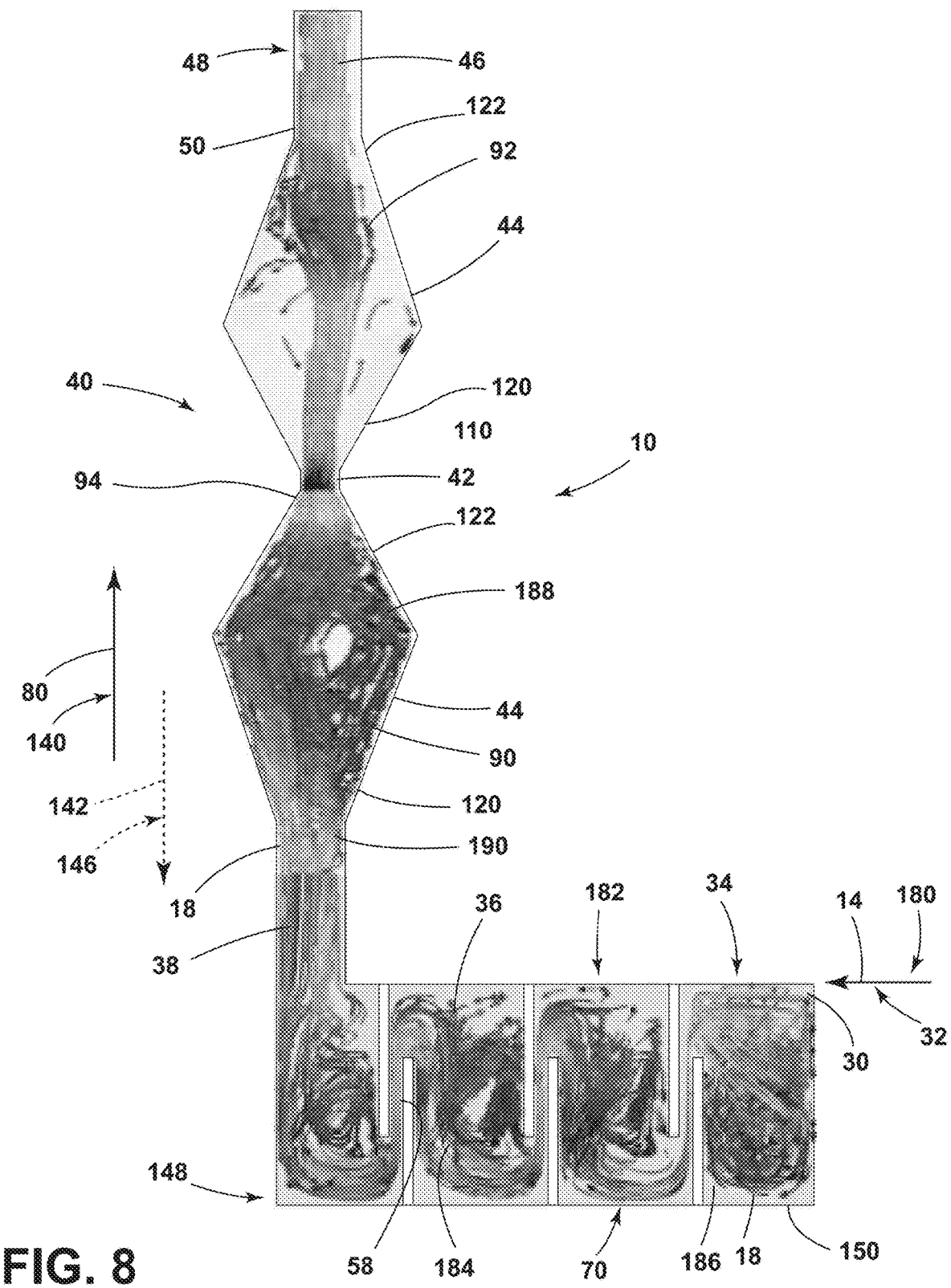
FIG. 8 is a schematic diagram illustrating a general operative concept of the main filter for the turbidity removal system.

As illustrated in FIGS. 7 and 8, a first turbulence chamber 90 of the opposing turbulence chambers 44 receives the fluid 14 from the last of the labyrinth chambers 34. Various turbulence flows 36 are generated within the first turbulence chamber 90. These turbulence flows 36 cause additional particulate matter 18 to be separated from the fluid 14. From the first turbulence chamber 90, the fluid 14 is moved through the constricting portion 42. In various aspects of the device, the constricting portion 42 can be in the form of a Venturi transition 94, a spirally configured section of the main filter 40, or other narrowed portion that constricts the flow of the fluid 14 between the first and second turbulence chambers 90, 92.

As exemplified in FIGS. 3-8, where the Venturi transition 94 is utilized, movement of the fluid 14 through the Venturi transition 94 causes an acceleration 110 of the fluid 14 through the Venturi transition 94. This acceleration 110 can result in a change in the flow of the fluid 14 to be more laminar as it exits the Venturi transition 94. This acceleration 110 of the fluid 14 into and through the Venturi transition 94 causes a further separation of particulate matter 18 from the fluid 14. This results in the separation of finer particulate matter 18 from the fluid 14. Additional turbulence flows 36 are generated within the second turbulence chamber 92 of the opposing turbulence chambers 44, to further separate particulate matter 18 from the fluid 14. The fluid 14 is then directed to the fluid outlet 50 for delivery to another portion of the appliance 12 for use.

Referring again to FIGS. 3-10, each of the turbulence chambers of the main filter 40 include a diverging inlet 120 and a converging outlet 122. In the first turbulence chamber 90, the diverging inlet 120 receives the fluid 14 from the last of the labyrinth chambers 34 and directs the fluid 14 into the first turbulence chamber 90. The diverging inlet 120 of the first turbulence chamber 90 causes the fluid 14 to flow in a turbulent manner within the first turbulence chamber 90. At the other end of the first turbulence chamber 90, the converging outlet 122 leads into the constricting portion 42 of the main filter 40. The second turbulence chamber 92 includes the diverging inlet 120 that defines the opposing side of the constricting portion 42 and cooperates with the converging outlet 122 of the first turbulence chamber 90 to generate variations in the turbulence flow 36 of the fluid 14 moving through the constricting portion 42. As discussed above, wherein the constricting portion 42 is in the form of the Venturi transition 94, an acceleration 110 of the fluid 14 is generated within the fluid 14 as it moves through the main filter 40. The converging outlet 122 of the second turbulence chamber 92 leads to the fluid outlet 50 of the main filter 40 where the fluid 14 is moved to another portion of the appliance 12 for use or reuse.

Figure 9:
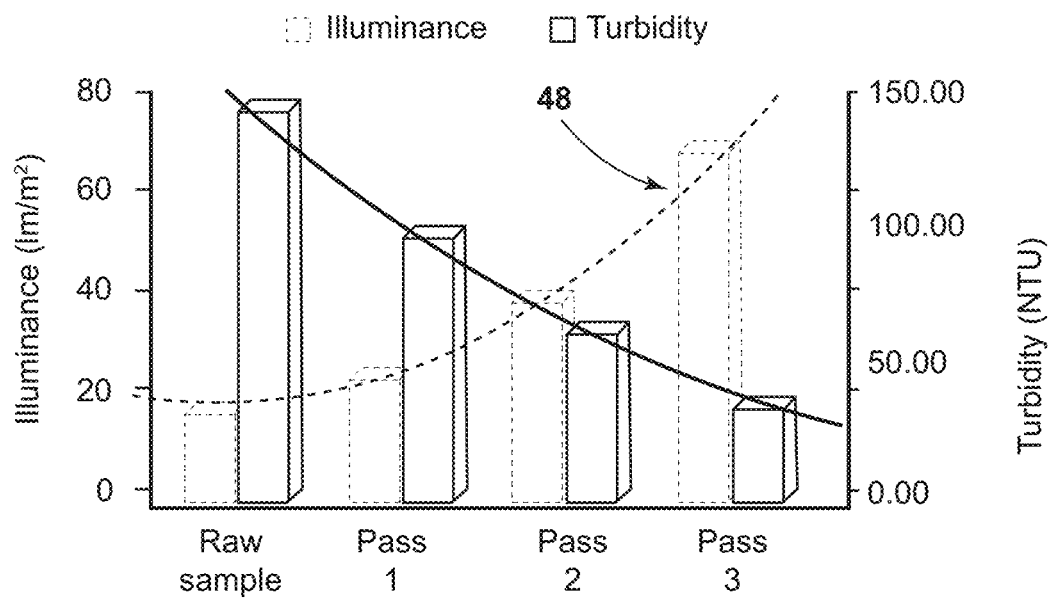
FIG. 9 is a schematic diagram illustrating a relationship between turbidity and the luminance within a fluid.
Figure 10:
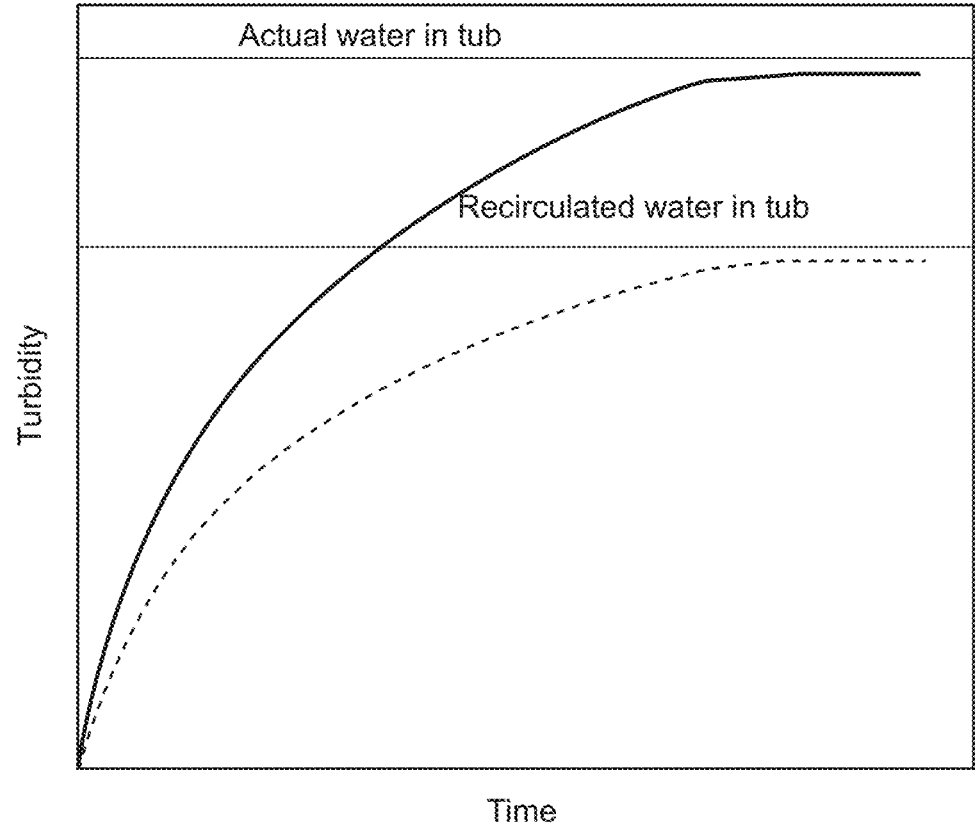
FIG. 10 is a schematic diagram illustrating a graph that shows operation of the turbidity removal system over time as water is circulated through the appliance.
Figure 11:
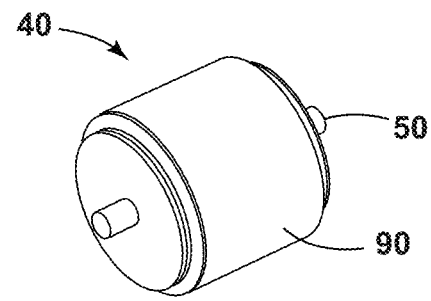
FIGS. 11-15 are side perspective views of various aspects of the main filter for the turbidity removal system.
Figure 12:
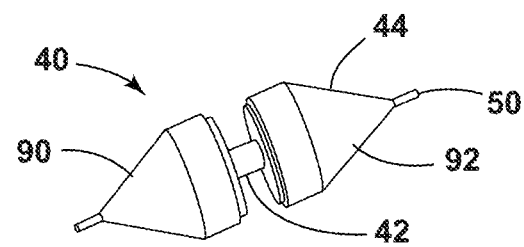
Figure 13:
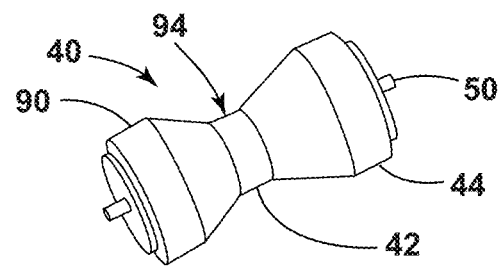
Figure 14:
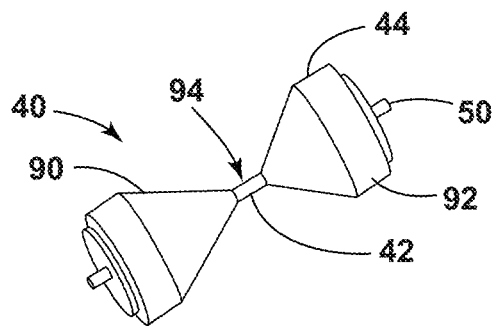
Figure 15:
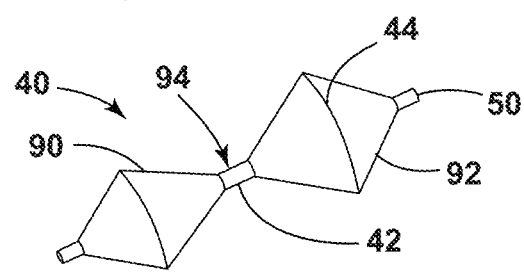

Referring now to FIGS. 9 and 10, the turbidity and illuminance 48 of the fluid 14 are inversely proportional. Stated another way, as the turbidity decreases, the illuminance 48 increases. Typically, turbidity is defined as the suspended material within the fluid 14 that causes haziness or cloudiness of fluid 14. The turbidity is typically caused by particulate matter 18 within the fluid 14. Conversely, illuminance 48 is defined as the clarity of the water. As discussed above, when the turbidity decreases, and the illuminance 48 increases, the fluid 14 is more able to accomplish various tasks within the appliance 12. In addition, these tasks are accomplished in a more efficient manner within the appliance 12.

In the case of a laundry appliance 12, water having a lower turbidity is more able to absorb detergents and other chemistries, and is also more able to collect dirt and other foreign material from clothing or articles 54 to be treated within the processing chamber 52. Similarly, in the case of a dishwasher, a lower turbidity in the fluid 14 allows the fluid 14 to be more efficient at carrying the various detergents and chemistries and also removing foreign matter from the articles 54 being processed therein. The same phenomenon is also true for other water-operating appliances. Such appliances can include, but are not limited to, water heaters, water softeners, refrigerators, air conditioners, steam-generating appliances, other laundry appliances, various cooking appliances, combinations thereof, and other similar commercial and household appliances and fixtures. Using the turbidity removal system 10, the turbidity in the fluid 14 is reduced and the illuminance 48 is increased to allow a more efficient use of the fluid 14 within the appliance 12.

Referring again to FIGS. 3-8, at certain points within the use of an appliance 12, typically after operation of a particular cycle, or at regular intervals, the separated particulate matter 18 and foreign material can be removed from the turbidity removal system 10. During performance of an operative cycle, the fluid 14 is moved through the turbidity removal system 10 in a filtering direction 140 to separate the particulate matter 18 from the fluid 14 that produces the second and third turbidity levels 38, 46. In other words, the fluid 14 moves in the filtering direction 140 to decrease the turbidity and increase the illuminance 48 of the fluid 14 within the turbidity removal system 10. To remove the captured or separated particulate matter 18, the fluid 14 can flow in an opposing flushing direction 142 to direct the separated particulate matter 18 to a drain outlet 144. In this flushing direction 142, fluid 14 is moved in a downward direction 146 through the main filter 40 and toward the drain outlet 144. Within the labyrinth chambers 34, each labyrinth chamber 34 can include a particulate collection portion 148 that is positioned at or near a base 150 of each respective labyrinth chamber 34. In such an embodiment, each of the labyrinth chambers 34, individually or collectively, can include at least one operable particulate membrane 152 that allows the passage of the separated particulate matter 18 to be delivered from the particulate collection portion 148 to the drain channel 56. This drain channel 56 is generally in a sloped configuration and leads to the drain outlet 144 for the turbidity removal system 10.

The drain outlet 144, in certain aspects of the device can include one or more valves 154 to allow for movement of the fluid 14 in the flushing direction 142 toward the drain outlet 144. In this manner, the valves 154 can be used to direct the flow of fluid 14 through the drain channel 56, rather than through the various labyrinth chambers 34. In the filtering direction 140, the valves 154 and, in certain aspects, the particulate membrane 152, can be operated to promote the flow of fluid 14 in the upward direction 80 and through the main filter 40. The particulate membrane 152 that is positioned at the base 150 of the various labyrinth chambers 34 can be a passive membrane that allows for a continuous flow of fluid 14 therethrough. In such an embodiment, the particulate membrane 152 operates in combination with the various valves 154 to control the movement of the fluid 14 through the labyrinth chambers 34. In certain aspects of the device, the particulate membrane 152 can be in the form of various louvers or a sliding panels that can open and close various membranes or apertures to allow the passage of the fluid 14 in the flushing direction 142. As stated previously, the flushing direction 142 of the fluid 14 is used to direct the separated particulate matter 18 and foreign matter to the drain outlet 144 for the turbidity removal system 10.

Referring again to FIGS. 1-8, the positioning of the main filter 40 with respect to the fluid outlet 50 and the drain outlet 144 is configured to allow for the movement of the fluid 14 in the filtering and flushing directions 140, 142. The fluid outlet 50 of the main filter 40 is positioned downstream of the main filter 40 in the filtering direction 140 and the drain outlet 144 is positioned downstream of the main filter 40 in the flushing direction 142.

Referring now to FIGS. 11-15, to assist in the movement of the fluid 14 in the filtering and flushing directions 140, 142, the opposing turbulence chambers 44 can include various cross-sectional shapes and configurations. Additionally, in certain aspects of the device, the main filter 40 may include a single turbulence chamber. Also, the main filter 40 can include more than one constricting portion 42, as exemplified in the device of FIG. 11. These various shapes and configurations can provide different turbulence flows 36 within the main filter 40 for accomplishing various filtering operations. These various filtering operations and the shapes of the main filter 40 used therefore, can be modified depending upon the type of filtering operation that needs to be accomplished. Based upon the type of turbulence flow 36 that is required to make a certain type of particulate matter 18, the shape of the main filter 40 may vary depending upon the type of appliance 12, the general turbidity of the fluid source, and the nature of the various particulate matter 18 necessary to be separated. These various configurations can be provided for during manufacture so that different configurations of the turbidity removal system 10 can be incorporated within appliances 12 and used within particular settings and configurations. The various configurations of the main filters 40 will be described more fully below.

With respect to the configuration of the main filter 40 as exemplified in FIGS. 3-8, the opposing turbulence chambers 44 each include opposing conical sections that define the diverging inlet 120 and the converging outlet 122 for each turbulence chamber of the opposing turbulence chambers 44. As discussed above, this particular configuration of the main filter 40 can be used to provide various turbulence flows 36 as well as an accelerating Venturi transition 94 that is positioned between the opposing turbulence chambers 44. This particular configuration of the main filter 40 has been shown to be effective in certain laundry appliance configurations. It should be understood that other configurations of the main filter 40 can be utilized within laundry appliances, as was other commercial and household appliances.

In a laundry appliance setting, a laundry appliance 12 can include a chemistry dispensing mechanism 170 that selectively deposits at least one laundry chemistry into the fluid 14 having the third turbidity level 46, which has left the main filter 40. As discussed above, lowering the turbidity of the fluid 14 within an appliance 12 allows the fluid 14 to more efficiently and effectively deliver the chemistry to a processing chamber 52 for treating various articles 54 within the processing chamber 52.

An increased turbidity in the fluid 14 may result in greater water usage and also less efficient usage of the water that is moved through the appliance 12. By including the turbidity removal system 10, the turbidity of the fluid 14 is decreased so that less water is used and is also used more efficiently within the appliance 12.

Referring now to FIGS. 1-8, the particulate separating mechanism for the appliance 12, typically in the form of the turbidity removal system 10, includes the fluid inlet 30 that receives an inlet fluid 180, where the inlet fluid 180 includes particulate matter 18. A labyrinth separator 182 is positioned to generate a first turbulence 184 of the fluid 14, wherein the first turbulence 184 separates a first portion 186 of the particulate matter 18 into a particulate collection portion 148. As discussed above, the labyrinth separator 182 can include a single labyrinth chamber 34 or a plurality of labyrinth chambers 34, depending upon the configuration of the particular turbidity removal system 10. The turbidity removal system 10 can also include the main filter 40 that is positioned downstream of the labyrinth separator 182. This main filter 40 includes a constricting portion 42 and opposing turbulence chambers 44 that are vertically oriented to produce a second turbulence 188 of the fluid 14. This second turbulence 188 separates a second portion 190 of the particulate matter 18 from the fluid 14. A fluid outlet 50 is positioned downstream of the main filter 40 and delivers the fluid 14 having the first and second portions 186, 190 of the particulate matter 18 removed for use within the appliance 12. As discussed above, in the case of a laundry appliance 12, this fluid 14 having the first and second portions 186, 190 of the particulate matter 18 moved is used within a processing chamber 52 for processing laundry articles 54.

Referring again to FIGS. 1-8, the labyrinth separator 182 includes a plurality of labyrinth chambers 34 that are positioned in a horizontal configuration. The drain channel 56 is positioned below the labyrinth chamber 34 for collecting the first portion 186 of the particulate matter 18 from the particulate collection portion 148. The main filter 40 is vertically oriented and the constricting portion 42, such as the Venturi transition 94, is positioned between the opposing turbulence chambers 44. The opposing turbulence chambers 44 each include a diverging inlet 120 and a converging outlet 122. The converging outlet 122 of the first turbulence chamber 90 and the diverging inlet 120 of the second turbulence chamber 92 define a throat that can be used to produce the Venturi effect within the main filter 40, as exemplified in FIGS. 7 and 8. This effect can be used to separate various particulate matter 18 from the fluid 14 to decrease the turbidity of the fluid 14 moving through the turbidity removal system 10.

As exemplified in FIGS. 1-8, as the fluid 14 flows in a filtering direction 140, the first and second portions 186, 190 of the particulate matter 18 are separated from the fluid 14. The fluid 14 is also capable of flowing in the closing flushing direction 142 to direct the separated first and second portions 186, 190 of the particulate matter 18 to the drain outlet 144. The flushing direction 142 can be described as an opposing flow of fluid 14 through the main filter 40. In addition, the flushing flow of fluid 14 can be in the same direction as the filtering flow with respect to the labyrinth separator 182 and the plurality of labyrinth chambers 34. In the flushing direction 142, various valves 154 or operating mechanisms are manipulated so that the flow of fluid 14 moves through the drain channel 56 to move the separated particulate matter 18, such as the first and second portions 186, 190 of the particulate matter 18 toward the drain outlet 144. As discussed above, this operating mechanism can include an operable particulate membrane 152 that delivers the particulate matter 18 from a particulate collection portion 148 of the labyrinth separator 182 toward the drain channel 56.

Referring again to FIGS. 1-8, the turbidity removal system 10 for the appliance 12 can include a fluid inlet 30 that receives the inlet fluid 180, where the inlet fluid 180 includes a particulate matter 18. The labyrinth separator 182 generates the first turbulence 184 of the fluid 14. This first turbulence 184 separates the first portion 186 of the particulate matter 18 into the particulate collection portion 148 of the labyrinth separator 182. The main filter 40 is positioned downstream of the labyrinth separator 182 and includes a Venturi transition 94 and opposing turbulence chambers 44 that generate the second turbulence 188 of the fluid 14. The second turbulence 188 separates a second portion 190 of the particulate matter 18 from the fluid 14. The fluid outlet 50 then delivers the fluid 14 having first and second portions 186, 190 of the particulate matter 18 removed into a separate portion of the appliance 12 for use or reuse therein.

Referring now to FIGS. 11-15, various configurations of the main filter 40 are exemplified. These configurations of the main filter 40 can include a single turbulence chamber as exemplified in FIG. 11, as well as various combinations of converging and/or diverging geometries that are separated by a narrow throat or other constricting portion 42 which may be in the form of a Venturi transition 94 of the main filter 40. In addition, the main filter 40 can include various configurations of the diverging inlet 120 and the converging outlet 122. Moreover, the divergence and convergence of the inlet 120 and outlet 122 can be adjusted to accomplish various turbulence flows 36 within the main filter 40. As discussed above, these various configurations of the main filter 40 can be utilized within different aspects of the turbidity removal system 10 for use within different appliances, within different water quality settings, within different geographic areas that may have different water filtering concerns and considerations. In certain aspects of the device, the main filter 40 for the turbidity removal system 10 can be removed and replaced with a similar filter or a different configuration filter depending upon the desired filtering operation to be performed within the turbidity removal system 10.

According to various aspects of the device, the turbidity removal system 10 can be used within any one of various appliances 12 within household and commercial settings. Such appliances 12 can include, but are not limited to, laundry appliances, dishwashing appliances, refrigerators, hot water heaters, water softeners, water purifiers, cooking appliances, countertop appliances, and other similar appliances that use and/or recirculate water therein for use or reuse.

According to another aspect of the present disclosure, a laundry appliance includes a fluid inlet that receives fluid having a first turbidity level. A plurality of labyrinth chambers generate a turbulence flow within the fluid to define a second turbidity level. A main filter is positioned downstream of the plurality of labyrinth chambers and has at least one constricting portion and opposing turbulence chambers that produces a third turbidity level. The second turbidity level is less than the first turbidity level and greater than the third turbidity level. A fluid outlet delivers the fluid having the third turbidity level into a processing chamber for processing laundry articles.

According to another aspect, the plurality of labyrinth chambers are positioned in a horizontal configuration, and wherein a drain channel is positioned below the plurality of labyrinth chambers for collecting separated particulate matter.

According to yet another aspect, the main filter is vertically oriented and the constricting portion includes a Venturi transition positioned between the opposing turbulence chambers.

According to another aspect of the present disclosure, the opposing turbulence chambers each include a diverging inlet and a converging outlet.

According to another aspect, the fluid flows in a filtering direction to separate the particulate matter from the fluid to produce the second and third turbidity levels. The fluid flows in an opposing flushing direction to direct separated particulate matter to a drain outlet.

According to yet another aspect, the fluid outlet of the main filter is positioned downstream of the main filter in the filtering direction and the drain outlet is positioned downstream of the main filter in the flushing direction.

According to another aspect of the present disclosure, each labyrinth chamber of the plurality of labyrinth chambers includes a particulate collection portion at a base of each respective labyrinth chamber.

According to another aspect, a chemistry dispensing mechanism selectively deposits at least one laundry chemistry into the fluid having the third turbidity level.

According to yet another aspect, the plurality of labyrinth chambers includes at least one operable particulate membrane that delivers the particulate matter from the particulate collection portion to the drain channel.

According to another aspect of the present disclosure, the opposing turbulence chambers each include opposing conical sections that define the diverging inlet and a converging outlet for each turbulence chamber of the opposing turbulence chambers.

According to another aspect, a particulate separating mechanism for an appliance includes a fluid inlet that receives an inlet fluid. The inlet fluid includes particulate matter. A labyrinth separator is positioned to generate a first turbulence of the fluid. The first turbulence separates a first portion of the particulate matter into a particulate collection portion. A main filter is positioned downstream of the labyrinth separator and has a constricting portion and opposing turbulence chambers that are vertically oriented to produce a second turbulence of the fluid. The second turbulence separates a second portion of the particulate matter from the fluid. A fluid outlet delivers the fluid having the first and second portions of the particulate matter removed into a processing chamber for processing articles.

According to yet another aspect, the labyrinth separator includes a plurality of labyrinth chambers that are positioned in a horizontal configuration. A drain channel is positioned below the plurality of labyrinth chambers for collecting the first portion of the particulate matter from the particulate collection portion.

According to another aspect of the present disclosure, the main filter is vertically oriented and the constricting portion includes a Venturi transition that is positioned between the opposing turbulence chambers. The opposing turbulence chambers each include a diverging inlet and a converging outlet.

According to another aspect, the fluid flows in a filtering direction to separate the first and second portions of the particulate matter from the fluid. The fluid flows in an opposing flushing direction to direct separated first and second portions of the particulate matter to a drain outlet.

According to yet another aspect, the fluid outlet of the main filter is positioned downstream of the main filter in the filtering direction. The drain outlet is positioned downstream of the main filter in the flushing direction.

According to another aspect of the present disclosure, a chemistry dispensing mechanism selectively deposits at least one laundry chemistry into the fluid having the first and second portions of the particulate matter removed.

According to another aspect, the plurality of labyrinth chambers includes at least one operable particulate membrane that delivers the particulate matter from the particulate collection portion to the drain channel.

According to yet another aspect, a particulate separating mechanism for an appliance includes a fluid inlet that receives an inlet fluid. The inlet fluid includes particulate matter. A labyrinth separator generates a first turbulence of the fluid. The first turbulence separates a first portion of the particulate matter into a particulate collection portion. A main filter is positioned downstream of the labyrinth separator and has a Venturi transition and opposing turbulence chambers that generates a second turbulence of the fluid. The second turbulence separates a second portion of the particulate matter from the fluid. A fluid outlet delivers the fluid having the first and second portions of the particulate matter removed into a processing chamber for processing articles.

According to another aspect of the present disclosure, the labyrinth separator includes a plurality of labyrinth chambers that are positioned in a horizontal configuration. A drain channel is positioned below the plurality of labyrinth chambers for collecting the first portion of the particulate matter from the particulate collection portion.

According to another aspect, the main filter is vertically oriented and the Venturi transition is positioned between the opposing turbulence chambers. The opposing turbulence chambers each include a diverging inlet and a converging outlet.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A particulate separating mechanism for an appliance, the particulate separating mechanism comprising:
    a fluid inlet that receives an inlet fluid, wherein the inlet fluid includes particulate matter;
    a labyrinth separator positioned to generate a first turbulence of the inlet fluid, wherein the first turbulence separates a first portion of the particulate matter into a particulate collector disposed within a base of the labyrinth separator;
    a main filter positioned downstream of the labyrinth separator and having a constricting portion and opposing turbulence chambers that are vertically oriented to produce a second turbulence of the inlet fluid, wherein the second turbulence separates a second portion of the particulate matter from the inlet fluid; and
    a fluid outlet that delivers the inlet fluid having the first and second portions of the particulate matter removed into a processing chamber for processing articles, wherein
        the labyrinth separator includes a plurality of labyrinth chambers that are positioned in a horizontal configuration;
        a drain channel is positioned below the plurality of labyrinth chambers for collecting the first portion of the particulate matter from the particulate collector; and
        the plurality of labyrinth chambers includes at least one operable particulate membrane that delivers the first portion of the particulate matter from the particulate collector to the drain channel.

2. The particulate separating mechanism of claim 1, wherein the main filter is vertically oriented and the constricting portion includes a Venturi transition that is positioned between the opposing turbulence chambers, and wherein the opposing turbulence chambers each include a diverging inlet and a converging outlet.

3. The particulate separating mechanism of claim 1, wherein the inlet fluid flows in a filtering direction to separate the first and second portions of the particulate matter from the inlet fluid, and wherein the inlet fluid flows in an opposing flushing direction to direct the separated first and second portions of the particulate matter to a drain outlet.

4. The particulate separating mechanism of claim 3, wherein the fluid outlet is positioned downstream of the main filter in the filtering direction and wherein the drain outlet is positioned downstream of the main filter in the opposing flushing direction.

5. The particulate separating mechanism of claim 4, wherein the fluid outlet is attached to the main filter.

6. The particulate separating mechanism of claim 1, further comprising:
    a chemistry dispenser that selectively deposits at least one laundry chemistry into the inlet fluid having the first and second portions of the particulate matter removed.

7. The particulate separating mechanism of claim 6, wherein the at least one laundry chemistry is deposited into the inlet fluid downstream of the main filter.

8. The particulate separating mechanism of claim 1, wherein the at least one operable particulate membrane includes louvers.

9. The particulate separating mechanism of claim 1, wherein the at least one operable particulate membrane includes sliding panels.

10. The particulate separating mechanism of claim 1, wherein each labyrinth chamber of the plurality of labyrinth chambers includes a respective section of the particulate collector.

11. The particulate separating mechanism of claim 1, wherein the main filter is vertically oriented and the constricting portion includes a Venturi transition positioned between the opposing turbulence chambers.

12. The particulate separating mechanism of claim 1, wherein the opposing turbulence chambers each include a diverging inlet and a converging outlet.

13. The particulate separating mechanism of claim 12, wherein the opposing turbulence chambers each include opposing conical sections that define the diverging inlet and a converging outlet for each turbulence chamber of the opposing turbulence chambers.

14. A particulate separating mechanism for an appliance, the particulate separating mechanism comprising:
    a fluid inlet that receives an inlet fluid, wherein the inlet fluid includes particulate matter;
    a labyrinth separator that generates a first turbulence of the inlet fluid, wherein the first turbulence separates a first portion of the particulate matter into a particulate collector disposed within a base of the labyrinth separator, wherein a drain channel is positioned below the labyrinth separator collecting the first portion of the particulate matter from the particulate collector, and wherein the labyrinth separator includes at least one operable particulate membrane that delivers the first portion of the particulate matter from the particulate collector to the drain channel;

a main filter positioned downstream of the labyrinth separator and having a Venturi transition and opposing turbulence chambers that generates a second turbulence of the inlet fluid, wherein the second turbulence separates a second portion of the particulate matter from the inlet fluid; and a fluid outlet that delivers the inlet fluid having the first and second portions of the particulate matter removed into a processing chamber for processing articles.

15. The particulate separating mechanism of claim 14, wherein the labyrinth separator includes a plurality of labyrinth chambers that are positioned in a horizontal configuration, and wherein a drain channel is positioned below the plurality of labyrinth chambers for collecting the first portion of the particulate matter from the particulate collector.

16. The particulate separating mechanism of claim 14, the main filter is vertically oriented and the Venturi transition is positioned between the opposing turbulence chambers, and wherein the opposing turbulence chambers each include a diverging inlet and a converging outlet.

* * * * *